United States Patent
Huang et al.

(10) Patent No.: US 12,388,558 B2
(45) Date of Patent: Aug. 12, 2025

(54) SPATIAL DIVERSITY IN CO-AXIAL MULTI-CIRCLE ORBITAL ANGULAR MOMENTUM MULTIPLEXING BASED COMMUNICATION

(71) Applicant: QUALCOMM Incorporated, San Diego, CA (US)

(72) Inventors: Min Huang, Beijing (CN); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 18/250,953

(22) PCT Filed: Dec. 7, 2020

(86) PCT No.: PCT/CN2020/134173
§ 371 (c)(1),
(2) Date: Apr. 27, 2023

(87) PCT Pub. No.: WO2022/120513
PCT Pub. Date: Jun. 16, 2022

(65) Prior Publication Data
US 2023/0403095 A1   Dec. 14, 2023

(51) Int. Cl.
*H04J 14/04* (2006.01)
*H04L 5/00* (2006.01)

(52) U.S. Cl.
CPC ............ *H04J 14/04* (2013.01); *H04L 5/0023* (2013.01); *H04L 5/0048* (2013.01); *H04L 5/0057* (2013.01)

(58) Field of Classification Search
CPC ........................................................ H04J 14/04
See application file for complete search history.

(56) References Cited

U.S. PATENT DOCUMENTS

| | | | |
|---|---|---|---|
| 11,172,430 | B2 | 11/2021 | Wang et al. |
| 2015/0333865 | A1 | 11/2015 | Yu et al. |
| 2016/0044647 | A1 | 2/2016 | Ashrafi et al. |
| 2016/0277173 | A1 | 9/2016 | Dutronc et al. |
| 2019/0020434 | A1 | 1/2019 | Adachi et al. |

(Continued)

FOREIGN PATENT DOCUMENTS

| | | |
|---|---|---|
| CN | 108322267 A | 7/2018 |
| WO | 2016164146 A2 | 10/2016 |

(Continued)

OTHER PUBLICATIONS

Ren et al., "Demonstration of OAM-based MIMO FSO link using spatial diversity and MIMO equalization for turbulence mitigation", OFC 2016, OSA 2016 (Year: 2016).*

(Continued)

*Primary Examiner* — Shi K Li
(74) *Attorney, Agent, or Firm* — Harrity & Harrity LLP

(57) ABSTRACT

Various aspects of the present disclosure generally relate to wireless communication. In some aspects, a transmitter of orbital angular momentum (OAM) multiplexing based communication may transmit, to a receiver of the OAM multiplexing based communication, a configuration message that indicates a configured set of transmitter circles. The transmitter may transmit, to the receiver, at least one data stream using the configured set of transmitter circles. Numerous other aspects are provided.

30 Claims, 12 Drawing Sheets

(56) References Cited

U.S. PATENT DOCUMENTS

2023/0096819 A1* 3/2023 Ni .................. H04B 7/0639
                                                    343/702
2023/0396294 A1  12/2023 Huang et al.

FOREIGN PATENT DOCUMENTS

WO      2019140178       7/2019
WO      2022104781 A1    5/2022

OTHER PUBLICATIONS

Zhang et al., "Performance analysis of an OAM multiplexing-based MIMO FSO system over atmospheric turbulence using space-time coding with channel estimation", Optics Express, vol. 25, No. 17, Aug. 2017 (Year: 2017).*
International Search Report and Written Opinion—PCT/CN2020/134173—ISA/EPO—Sep. 7, 2021.
Supplementary European Search Report—EP209644608—Search Authority—Munich—Aug. 6, 2024.
Zhang C., et al., "New Degrees of Freedom for Beamforming Manipulation in MIMO Transmission with OAM", 2019 IEEE Globecom Workshops (GC WKSHPS), Dec. 9, 2019, pp. 1-6, XP033735064, pp. 3-4, figure 2.
Zhang Y., et al., "Performance analysis of an OAM multiplexing-based MIMO FSO system over atmospheric turbulence using space-time coding with channel estimation", Optics Express, Aug. 21, 2017, vol. 25, No. 17, Aug. 9, 2017, pp. 19995-20011, XP055638877, p. 1.

* cited by examiner

800

| OAM mode index 1 | Tx circle group 1 | OAM mode index 2 | Tx circle group 2 | ... | OAM mode index N | Tx circle group N |

FIG. 8

SPATIAL DIVERSITY IN CO-AXIAL MULTI-CIRCLE ORBITAL ANGULAR MOMENTUM MULTIPLEXING BASED COMMUNICATION

CROSS-REFERENCE TO RELATED APPLICATION

This Patent Application is a 371 national stage of PCT Application No. PCT/CN2020/134173 filed on Dec. 7, 2020, entitled "SPATIAL DIVERSITY IN CO-AXIAL MULTI-CIRCLE ORBITAL ANGULAR MOMENTUM MULTIPLEXING BASED COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for spatial diversity in co-axial multi-circle orbital angular momentum multiplexing based communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-8 are diagrams illustrating examples associated with spatial diversity in co-axial multi-circle OAM multiplexing based communication, in accordance with various aspects of the present disclosure.

SUMMARY

Figure 1:
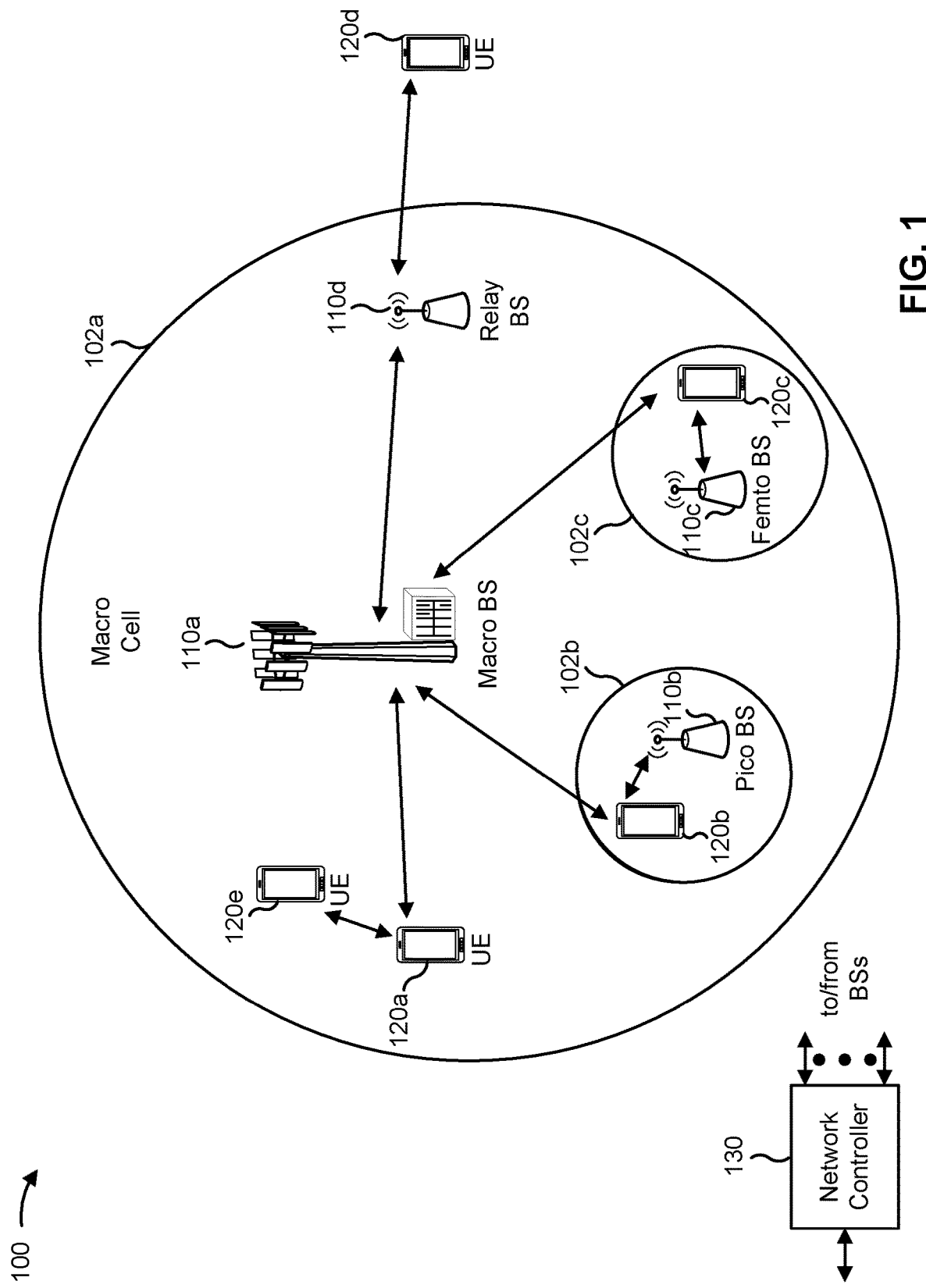
FIG. 1 is a diagram illustrating an example of a wireless network, in accordance with various aspects of the present disclosure.

In some aspects, a transmitter of orbital angular momentum (OAM) multiplexing based communication includes a memory and one or more processors operatively coupled to the memory, the memory and the one or more processors configured to transmit, to a receiver of the OAM multiplexing based communication, a configuration message that indicates a configured set of transmitter circles; and transmit, to the receiver, at least one data stream using the configured set of transmitter circles.

In some aspects, a receiver of OAM multiplexing based communication includes a memory and one or more processors operatively coupled to the memory, the memory and the one or more processors configured to: receive, from a transmitter of the OAM multiplexing based communication, a configuration message that indicates a configured set of transmitter circles; and receive, from the transmitter, at least one data stream using the configured set of transmitter circles.

In some aspects, a method of wireless communication performed by a transmitter of OAM multiplexing based communication includes transmitting, to a receiver of the OAM multiplexing based communication, a configuration message that indicates a configured set of transmitter circles; and transmitting, to the receiver, at least one data stream using the configured set of transmitter circles.

In some aspects, a method of wireless communication performed by a receiver of OAM multiplexing based communication includes receiving, from a transmitter of the OAM multiplexing based communication, a configuration message that indicates a configured set of transmitter circles; and receiving, from the transmitter, at least one data stream using the configured set of transmitter circles.

In some aspects, a non-transitory computer-readable medium storing a set of instructions for wireless communication includes one or more instructions that, when executed by one or more processors of a transmitter of OAM multiplexing based communication, cause the transmitter to: transmit, to a receiver of the OAM multiplexing based communication, a configuration message that indicates a configured set of transmitter circles; and transmit, to the receiver, at least one data stream using the configured set of transmitter circles.

In some aspects, a non-transitory computer-readable medium storing a set of instructions for wireless communication includes one or more instructions that, when executed by one or more processors of a receiver of OAM multiplexing based communication, cause the receiver to: receive, from a transmitter of the OAM multiplexing based communication, a configuration message that indicates a configured set of transmitter circles; and receive, from the transmitter, at least one data stream using the configured set of transmitter circles.

In some aspects, an apparatus for OAM multiplexing based communication includes means for transmitting, to a receiver of the OAM multiplexing based communication, a configuration message that indicates a configured set of transmitter circles; and means for transmitting, to the receiver, at least one data stream using the configured set of transmitter circles.

In some aspects, an apparatus for OAM multiplexing based communication includes means for receiving, from a transmitter of the OAM multiplexing based communication, a configuration message that indicates a configured set of transmitter circles; and means for receiving, from the transmitter, at least one data stream using the configured set of transmitter circles.

Aspects generally include a method, apparatus, system, computer program product, non-transitory computer-readable medium, user equipment, base station, wireless communication device, transmitter, receiver, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
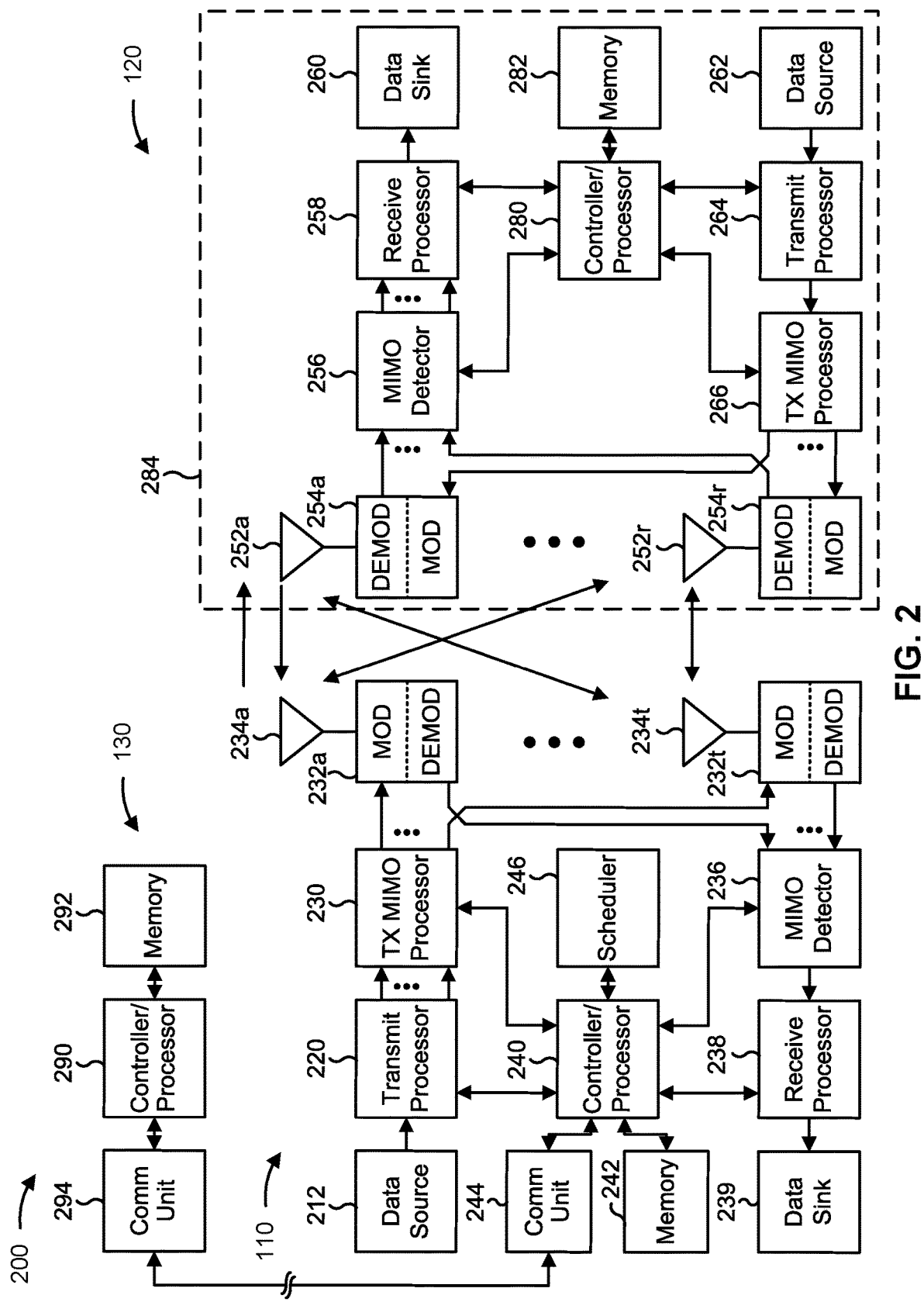
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-10.

Controller/processor 240 of base station 110, controller/processor 280 of UE 120, and/or any other component(s) of FIG. 2 may perform one or more techniques associated with spatial diversity in co-axial multi-circle orbital angular momentum (OAM) multiplexing based communication, as described in more detail elsewhere herein. In some aspects, the transmitter of OAM multiplexing based communications and/or the receiver of OAM multiplexing based communications described herein is the base station 110, is included in the base station 110, or includes one or more components of the base station 110 shown in FIG. 2. In some aspects, the transmitter of OAM multiplexing based communications and/or the receiver of OAM multiplexing based communications described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a transmitter of OAM multiplexing based communication includes means for transmitting, to a receiver of the OAM multiplexing based communication, a configuration message that indicates a configured set of transmitter circles; and/or means for transmitting, to the receiver, at least one data stream using the configured set of transmitter circles. In some aspects, the means for the transmitter to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the transmitter to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the transmitter includes means for transmitting, to the receiver, a status message that indicates a number of transmitter circles available. In some aspects, the transmitter includes means for transmitting, to the receiver, a status message that indicates a number of transmitter circles available for each OAM mode of a plurality of OAM modes. In some aspects, the transmitter includes means for transmitting, to the receiver, a status message that indicates a maximum number of modes that can used by an indicated transmitter circle.

In some aspects, the transmitter includes means for receiving, from the receiver, a report message that indicates a suggested set of transmitter circles to be used. In some aspects, the transmitter includes means for transmitting, to the receiver, a plurality of reference signals corresponding to a plurality of transmitter circles, wherein at least one reference signal of the plurality of reference signals corresponds to an OAM mode of a corresponding transmitter circle, and wherein the suggested set of transmitter circles is based at least in part on a plurality of measured channel statuses corresponding to the plurality of reference signals. In some aspects, the transmitter includes means for transmitting a first signal using a first OAM mode of a first subset of transmitter circles, wherein the first signal is associated with a first data stream; or means for transmitting a second signal using a second OAM mode of a second subset of transmitter circles, wherein the second signal is associated with a second data stream.

In some aspects, a receiver of OAM multiplexing based communication includes means for receiving, from a transmitter of the OAM multiplexing based communication, a configuration message that indicates a configured set of transmitter circles; and/or means for receiving, from the transmitter, at least one data stream using the configured set of transmitter circles. In some aspects, the means for the receiver to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the receiver to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the receiver includes means for receiving, from the transmitter, a status message that indicates a number of transmitter circles available. In some aspects, the receiver includes means for receiving, from the transmitter, a status message that indicates a number of transmitter circles available for each OAM mode of a plurality of OAM modes. In some aspects, the receiver includes means for receiving, from the transmitter, a status message that indicates a maximum number of modes that can used by an indicated transmitter circle.

In some aspects, the receiver includes means for transmitting, to the transmitter, a report message that indicates a suggested set of transmitter circles to be used. In some aspects, the receiver includes means for receiving, from the transmitter, a plurality of reference signals corresponding to a plurality of transmitter circles, wherein at least one reference signal of the plurality of reference signals corresponds to an OAM mode of a corresponding transmitter circle, and wherein the suggested set of transmitter circles is based at least in part on a plurality of measured channel statuses corresponding to the plurality of reference signals. In some aspects, the receiver includes means for receiving a first signal using a first OAM mode of a first subset of transmitter circles, wherein the first signal is associated with a first data stream; or means for receiving a second signal using a second OAM mode of a second subset of transmitter circles, wherein the second signal is associated with a second data stream.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
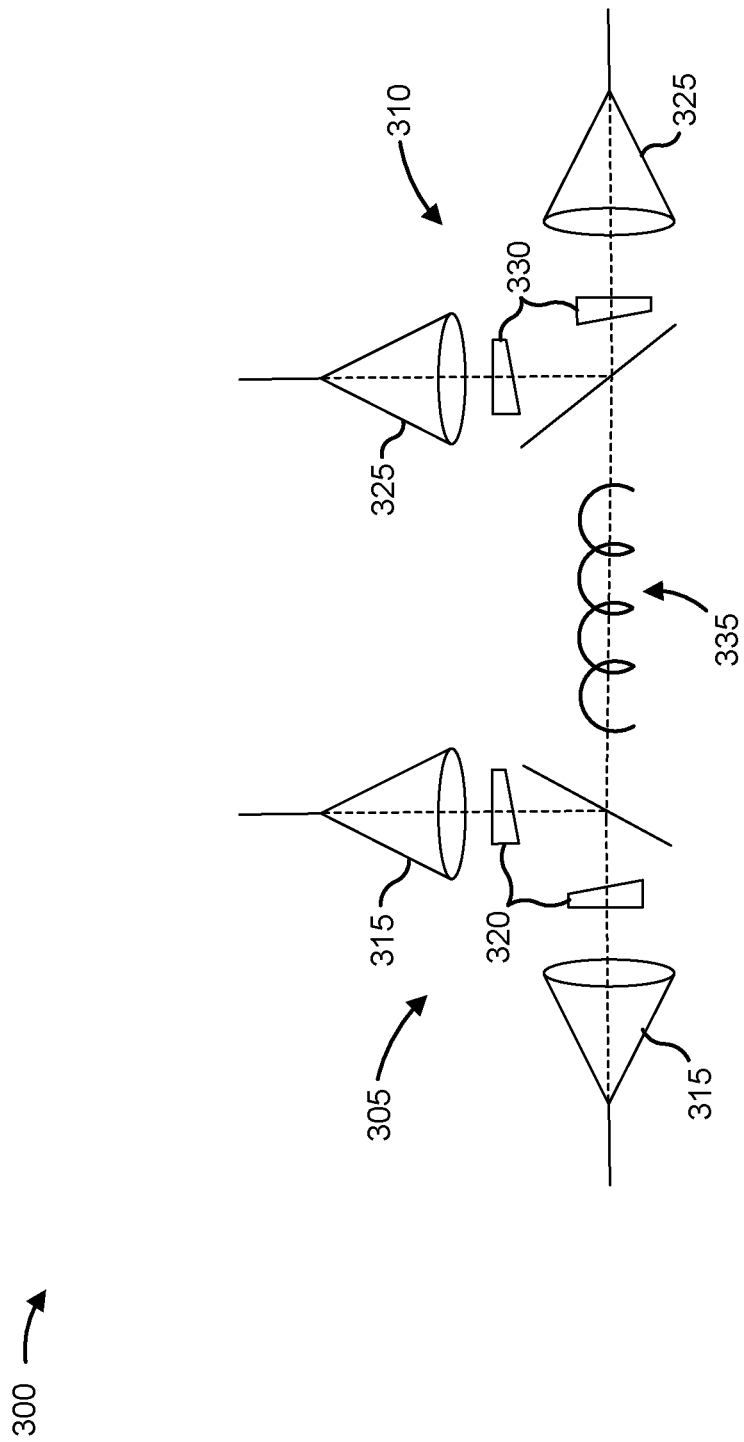
FIGS. 3 and 4 are diagrams illustrating examples of orbital angular momentum (OAM) multiplexing based communication, in accordance with various aspects of the present disclosure.

FIG. 3 is a diagram illustrating an example 300 of multi-aperture OAM multiplexing based communication, in accordance with various aspects of the present disclosure. As shown, a transmitter 305 and a receiver 310 may communicate with one another using OAM multiplexing based communication. According to various aspects, the transmitter 305 and/or the receiver 310 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the transmitter 305 may include a number of transmitter apertures 315 and a number of corresponding transmitter spiral phase plates (SPPs) 320. The receiver 310 may include a number of receiver apertures 325 and a number of corresponding receiver SPPs 330. Each transmitter aperture 315 may transmit a wave of one OAM mode (shown as, e.g., l=−1 and l=1). Each wave may be modulated by a corresponding transmitter SPP 320 to create a spiral wave 335. In some aspects, SPPs may be, or include, transmitter circles. For example, in some aspects, each SPP may be referred to as a transmitter circle (or receiver circle) due to the circular nature of cross sections of the spiral wave emitted.

Each receiver aperture 325 may receive the wave 335 transmitted by a corresponding transmitter 305. The wave 335 may be demodulated by a corresponding receiver SPP 330 to convert the spiral wave into a donut-shaped wave that is received by the corresponding receiver aperture 325. Due to mutual orthogonality among OAM modes, the wave 335 of one OAM mode may not be received by a receiver aperture 325 corresponding to the other OAM mode.

As indicated above, FIG. 3 is provided as an example. Other examples may differ from what is described with regard to FIG. 3.

Figure 4:
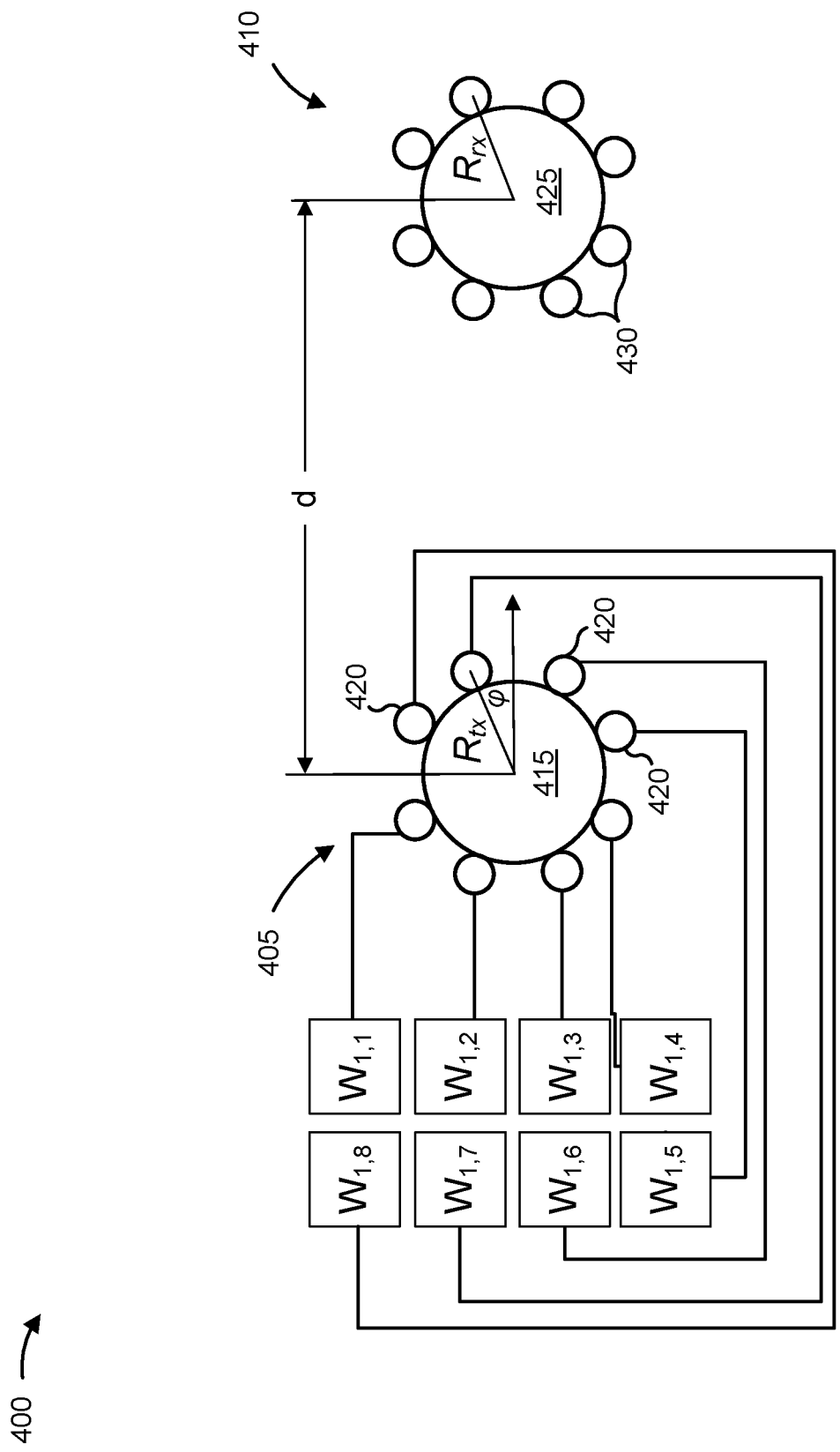

FIG. 4 is a diagram illustrating an example 400 of OAM multiplexing based communication using uniform circular array (UCA) antennas, in accordance with various aspects of the present disclosure. As shown, a transmitter 405 and a receiver 410 may communicate with one another using OAM multiplexing based communication. According to various aspects, the transmitter 405 and/or the receiver 410 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the transmitter 405 includes a UCA 415 having a plurality of OAM antennas 420 configured in a circle (or an at least approximately circular shape). In this regard, a UCA 415 may be referred to as a transmitter circle (or receiver circle). Similarly, the receiver 410 includes a UCA 425 having a plurality of OAM antennas 430 equipped in a circle (or at least approximately circular shape). By multiplying respective beamforming weights $w_l = [w_{l,1}, w_{l,2}, \ldots, w_{l,8}]^T$ onto each antenna, the transmitter 405 may generate a signal port. If the weight of each antenna 420 is equal to $\exp(i\phi l)$, where $\phi$ is the angle of antenna in the circle, l is the OAM mode order, then the beamformed port may be an equivalent OAM mode l. By using different beamforming weights $\exp(i\phi l')$, where $l' \neq l$, the transmitter 405 may generate multiple OAM modes.

For a channel matrix, H, from each transmit antenna 420 to each receive antenna 430, the beamformed channel matrix $\hat{H} = H \cdot [w_1, w_2, \ldots, w_L]$, and any two columns of $\hat{H}$ are orthogonal. Thus, the beamformed ports have no crosstalk. As a result, UCA OAM-based communication may realize high-level spatial multiplexing degree efficiently.

As explained above, OAM communications may use SPP or UCA antennas to transmit multiple orthogonal signals with different OAM modes. SPP-based OAM generates continuous spiral waves, and thus can form unlimited number of orthogonal OAM modes in theory. But in practice, due to propagation divergence and one mode per SPP, the number of effective OAM modes is limited (e.g., four modes in academic experiment). UCA-based OAM generates discrete spiral waves, and thus can form as many OAM modes as there are transmitter antennas. UCA-based OAM may be considered to be a form of MIMO whose eigen-based transmission precoding weights and reception combining weights are constantly equal to a discrete Fourier transform matrix, which is unaffected by communication parameters (e.g., distance, aperture size and carrier frequency) and thus can be implemented at low cost.

As indicated above, FIG. 4 is provided as an example. Other examples may differ from what is described with regard to FIG. 4.

Figure 5:
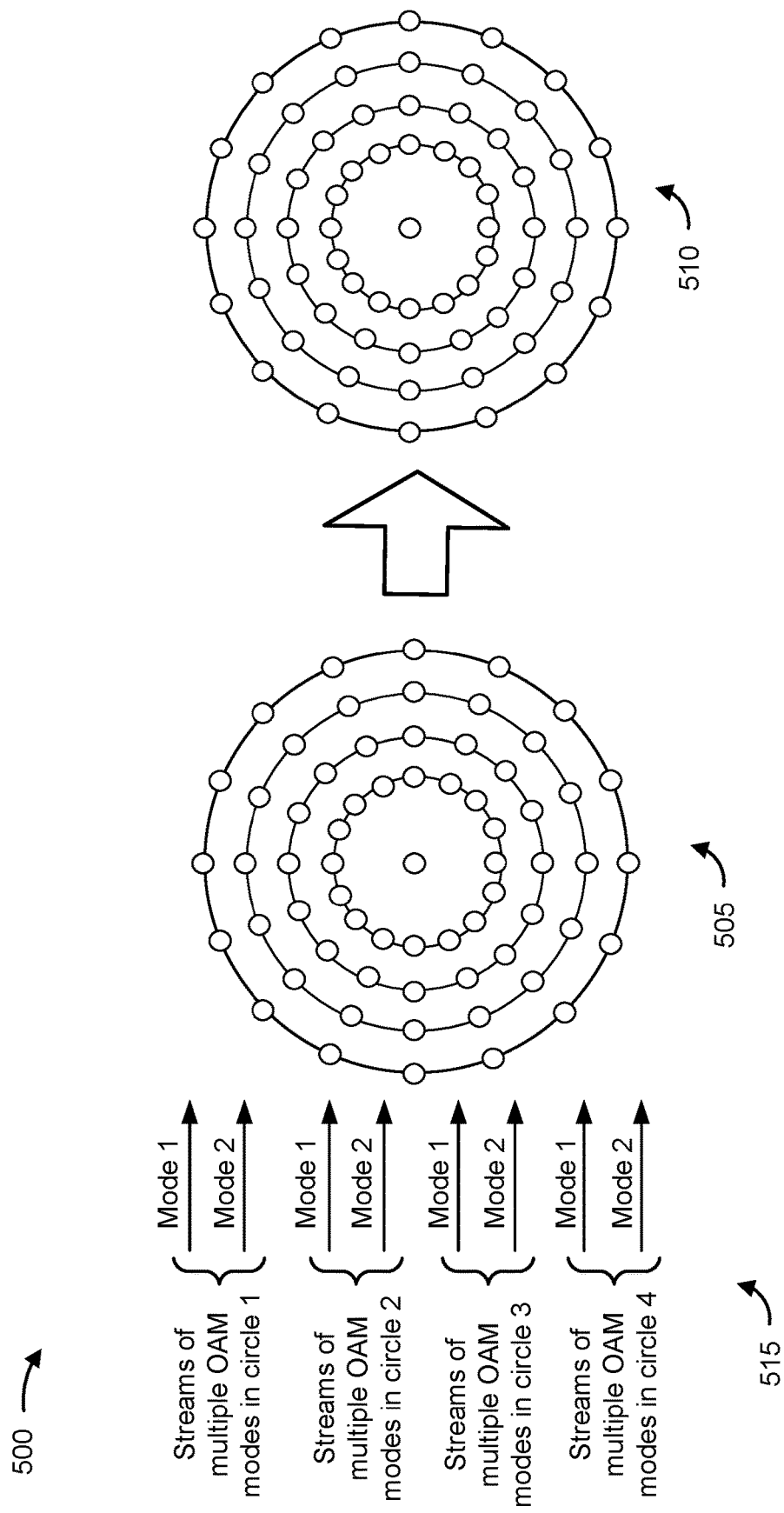
FIG. 5 is a diagram illustrating an example associated with co-axial multi-circle OAM multiplexing based communication, in accordance with various aspects of the present disclosure.

FIG. 5 is a diagram illustrating an example 500 associated with co-axial multi-circle OAM multiplexing based communication, in accordance with various aspects of the present disclosure. The multi-circle OAM multiplexing based communication may refer to communication between a transmitter 505 and a receiver 510. Multiple co-axial UCA antenna circles and/or multiple co-axial SPP-based apertures may be implemented at the transmitter 505 and the receiver 510.

As shown by reference number 515, a number of data streams of different OAM modes may be transmitted using each circle of the multi-circle transmitter 505. For example, as shown, a first data stream of each circle may be transmitted using a first OAM mode ("Mode 1"), and a second data stream of each circle may be transmitted using a second OAM mode ("Mode 2"). In some aspects, the intra-circle streams may be orthogonal. The inter-circle streams may be orthogonal with different OAM modes or non-orthogonal with the same OAM mode. For each OAM mode, there may be inter-circle interferences. For example, a stream transmitted from one circle using Mode 1 may be mutually interfered with a stream transmitted from another circle using Mode 1.

However, due to the mutual interference between the same modes of different transmitter circles, traditional transmission schemes based on inter-mode orthogonality may not be feasible. In some cases, mutually-interfered OAM modes in different aperture pairs may be precoded at the transmitter based on weights reported by the receiver. Though the feedback-based approach may achieve high channel gain when the reported precoding weights align with the channel eigenvectors, the approach may have disadvantages. For example, the approach relies on an OAM receiver's feedback on a precoding weight, which may increase system complexity and may be challenging when the carrier frequency is high (e.g., 0.1~1.0 THz). The precoding weights may be various, depending on the channel parameters (e.g., propagation distance, Tx/Rx aperture radius, carrier frequency), and including flexibility to support various precoding weights may increase hardware complexity, compared with hardware needed to support fixed precoding weights. As a result, implementation complexities of a feedback-based approach may outweigh gains.

Aspects of the techniques and apparatuses described herein may provide an approach that is not based on feedback, but rather involves spatial diversity transmissions. In some aspects, the transmitter may transmit a data stream of an OAM mode with spatial diversity schemes in a group of multiple co-axial transmitter circles. For example, multiple data streams of different OAM modes may be transmitted, each of which may be associated with a spatial diversity transmission involving one or more of a set of available transmitter circles. The transmitter may transmit a status message to the receiver indicating the number of available transmitter circles, and the receiver may transmit a report message indicating the indexes of preferred transmitter circles. The transmitter may transmit a configuration message that indicates the configured set of transmitter circles (the transmitter circles of the available transmitter circles that will be used in a transmission). In this way, aspects may facilitate reducing interference between antennas used for OAM multiplexing based communication. As a result, aspects may facilitate increases in throughput, signal reliability, signal quality, and/or the like without unnecessary increases in system complexity.

As indicated above, FIG. 5 is provided as an example. Other examples may differ from what is described with regard to FIG. 5.

Figure 6:
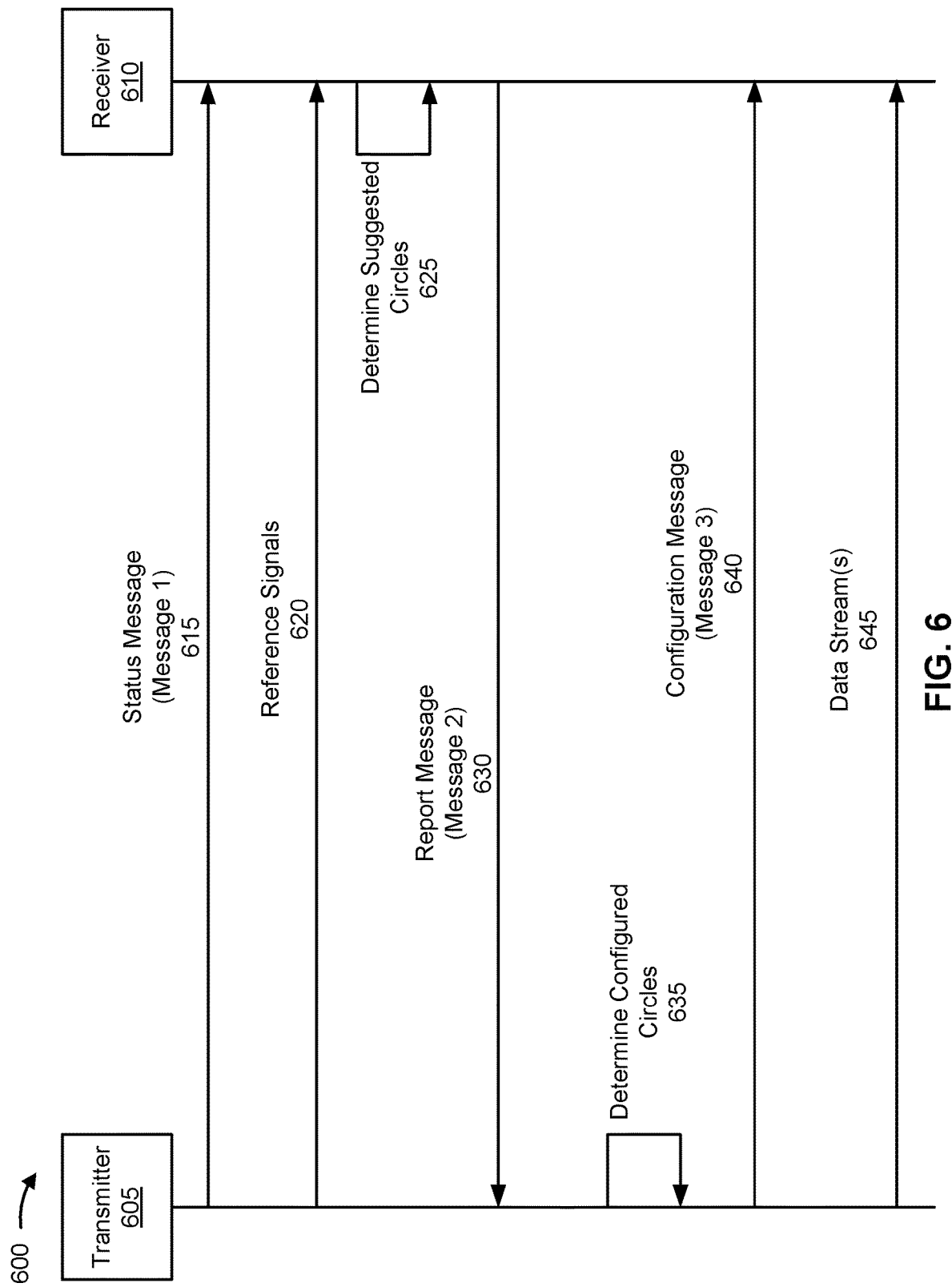

FIG. 6 is a diagram illustrating an example 600 associated with spatial diversity in co-axial multi-circle OAM multiplexing based communication, in accordance with various aspects of the present disclosure. As shown in FIG. 6, transmitter 605 of OAM multiplexing based communication and a receiver 610 of OAM multiplexing based communication may communicate with one another. As shown in FIG. 6, the transmitter 605 and the receiver 610 may communicate via one or more signaling messages (Message 1, Message 2, Message 3). Any one of more of these signaling messages may be transmitted via radio resource control (RRC) signaling, medium access control (MAC) control elements (MAC-CEs), and/or physical layer signaling such as downlink control information (DCI), uplink control information (UCI), and/or sidelink control information (SCI).

As shown by reference number 615, the transmitter 605 may transmit, to the receiver 610, a status message. The status message may indicate a number, $N_{max,overall}$, of transmitter circles available. In some aspects, the status message (which may be referred to as "Message 1") may indicate a number of transmitter circles, $N_{max,m}$, available for each OAM mode m of a plurality of OAM modes. The status message may indicate a maximum number of modes that can used by an indicated transmitter circle.

In some use cases, more transmitter circles than the actual used number may be configured to be reported, so that the transmitter 605 may have freedom to choose part of them by considering scheduling factors. For example, one transmitter circle may be scheduled to be used for some other OAM mode and/or transmission. If the number of modes for that transmitter circle reaches maximum capability, the transmitter 605 may select a different transmitter circle.

As shown by reference number 620, the transmitter 605 may transmit, to the receiver 610, a plurality of reference signals. The reference signals may correspond to a plurality of transmitter circles. In some aspects, at least one reference signal of the plurality of reference signals may correspond to an OAM mode of a corresponding transmitter circle.

As shown by reference number 625, the receiver 610 may determine suggested circles. For example, the transmitter 605 may transmit reference signals at each mode of each transmitter circle, and the receiver 610 may estimate the channel response, $g_{m,i,j}$, of each receiver circle of each mode (where m is the index of mode, i is the index of the transmitter circle, and j is the index of the receiver circle). In some aspects, the suggested set of transmitter circles may be based at least in part on a plurality of measured channel statuses corresponding to the plurality of reference signals.

In some aspects, for example, the receiver 610 may calculate the second-order norm (summed power) of each vector $[g_{m,i,1}, g_{m,i,2}, \ldots, g_{m,i,j}]$, denoted as $G_{m,i}$. The suggested transmitter circles may be those whose values of $G_{m,i}$ are the largest. The receiver 610 may select the preferred transmitter circles for each of a set of OAM modes. For example, in some aspects, the receiver 610 may select 2 transmitter circles for spatial diversity at each OAM mode (e.g., circles with radius=0.8 meters and 0.6 meters for OAM mode −2, −1, 1 and 2; and radius=0.4 meters and 0.2 meters for OAM mode 0). In some aspects, the receiver 610 may select transmitter circles such that the number of the modes that are transmitted at a selected circle i is not larger than $M_{max,i}$.

As shown by reference number 630, the receiver 610 may transmit, and the transmitter 605 may receive, a report message (which may be referred to as "Message 2") that indicates the suggested set of transmitter circles to be used. In some aspects, the report message may indicate at least one of: a set of transmitter circle indexes corresponding to the set of transmitter circles, a channel state information (CSI) indicator associated with the set of transmitter circles, or a parameter associated with a spatial diversity scheme. In some aspects, the CSI may include channel quality information (CQI).

As shown by reference number 635, the transmitter 605 may determine configured circles based on the suggested circles and/or scheduling considerations. As shown by reference number 640, the transmitter 605 may transmit, to the receiver 610, a configuration message (which may be referred to as "Message 3") that indicates a configured set of transmitter circles. In some aspects, the configuration message may indicate, for at least one data stream and at least one corresponding OAM mode, at least one of: an index of a transmitter circle of the configured set of transmitter circles or a parameter of a spatial diversity scheme.

As shown by reference number 645, the transmitter 605 may transmit, to the receiver 610, at least one data stream using the configured set of transmitter circles. In some aspects, the transmitter 605 may transmit the at least one data stream based at least in part on transmitting a first signal using a first OAM mode of a first subset of transmitter circles, where the first signal is associated with a first data stream; and transmitting a second signal using a second OAM mode of a second subset of transmitter circles, where the second signal is associated with a second data stream. In some aspects, the first subset of transmitter circles and the second subset of transmitter circles may be full overlapping, partial overlapping or non-overlapping.

In some aspects, the transmitter 605 may transmit the at least one data stream using a spatial diversity scheme. The transmission format may be irrelevant to (e.g., unaffected by) the channel status and system parameters (e.g., the communication distance, the Tx/Rx radiuses, the wavelength). In some aspects, the spatial diversity scheme may include at least one of: space-time block coding or space-frequency block coding.

In some aspects, for example, when the spatial-time block coding is used, the transmitted signals of the transmitter circles at the selected OAM mode may be generated in the following way: if the number of transmitter circles is two and the data symbols are $s_1$ and $s_2$, then at a first timing unit, the transmitted signals of two transmitter circles are $s_1$ and $s_2$ respectively; and at a second timing unit, the transmitted signals of the two transmitter circles are $-s_2^*$ and $s_1^*$ respectively. In some aspects, for example, when the spatial-frequency block coding is used, the transmitted signals of the transmitter circles at the selected OAM mode may be generated in the following way: if the number of transmitter circles is two and the data symbols are $s_1$ and $s_2$, then at a first frequency unit, the transmitted signals of the two transmitter circles are $s_1$ and $s_2$ respectively; at a second frequency unit, the transmitted signals of the two transmitter circles are $-s_2^*$ and $s_1^*$ respectively. The use of channel-irrelevant channel coding may enable spatial diversity transmission without requiring receiving feedback on precoding weights from the receiver 610 and/or without having to use channel-relevant precoding weights at the transmitter 605. In this way, aspects may reduce transmitter/receiver complexity and obtain spatial diversity gain.

As indicated above, FIG. 6 is provided as an example. Other examples may differ from what is described with respect to FIG. 6.

Figure 7:
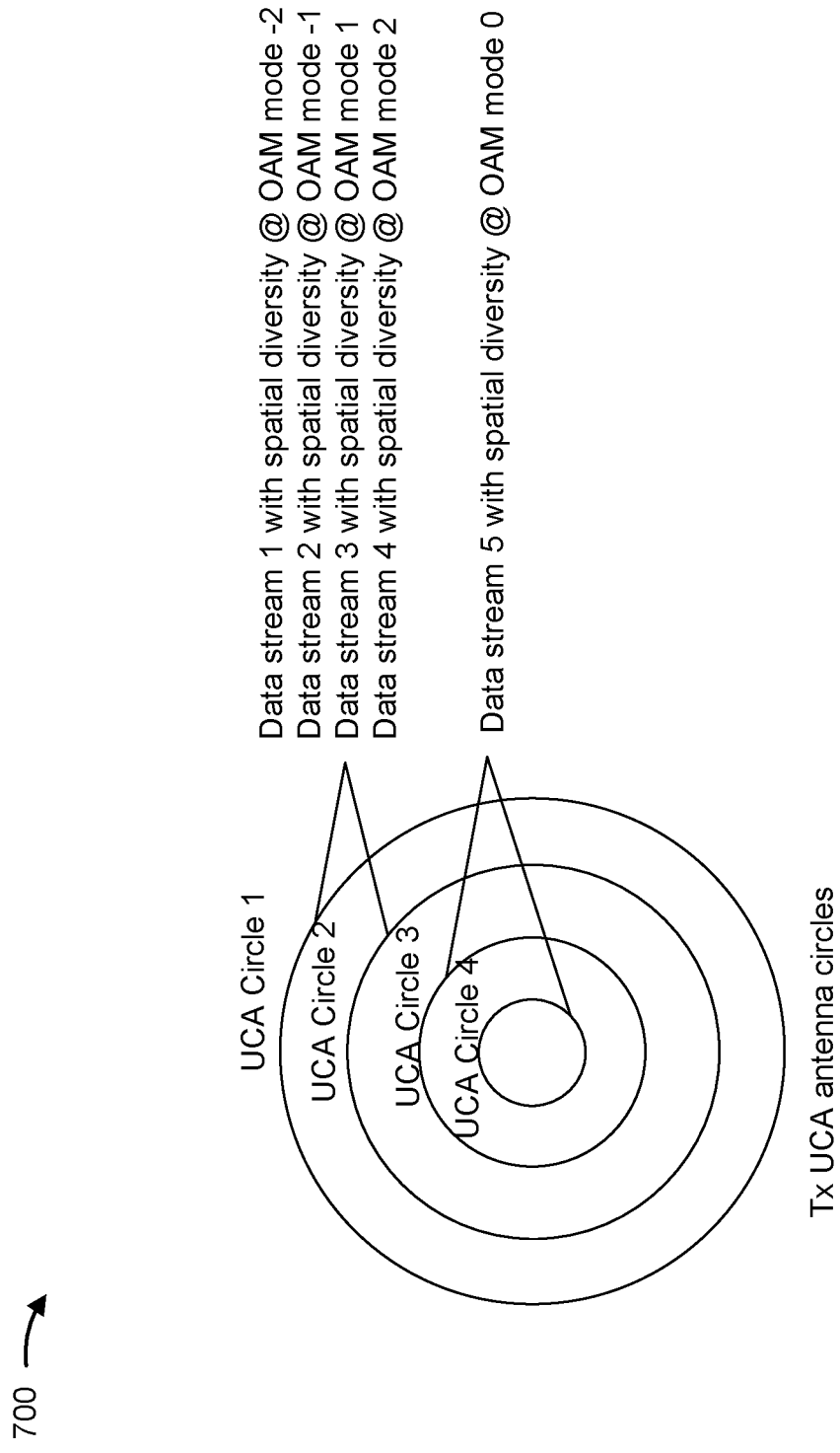

FIG. 7 is a diagram illustrating an example 700 associated with spatial diversity transmission in multi-circle OAM multiplexing based communication, in accordance with various aspects of the present disclosure. Example 700 depicts an illustrative allocation of data streams at OAM modes −2, −1, 0, 1, and 2 using transmitter circles (shown as Tx UCA antenna circles). As shown, such a transmitter circle array may transmit a number of data streams using spatial diversity.

As shown, for example, a first data stream ("data stream 1") may be transmitted using a first group of transmitter circles ("UCA Circle 1" and "UCA Circle 2") at an OAM mode −2. A second data stream ("data stream 2") may be transmitted using the first group of transmitter circles at an OAM mode −1, a third data stream ("data stream 3") may be transmitted using the first group of transmitter circles at an OAM mode 1, and a fourth data stream ("data stream 4") may be transmitted using the first group of transmitter circles at an OAM mode 2. A fifth data stream ("data stream 5") may be transmitted using a second group of transmitter circles ("UCA Circle 3" and "UCA Circle 4") at an OAM mode 0.

As indicated above, FIG. 7 is provided as an example. Other examples may differ from what is described with regard to FIG. 7.

FIG. 8 is a diagram illustrating an example 800 associated with spatial diversity transmission in multi-circle OAM multiplexing based communication, in accordance with various aspects of the present disclosure. Example 800 depicts an illustrative indication format for a configuration message (Message 3) described above in connection with FIG. 6. As shown, for example, a configuration message may include a matrix or bitmap of indexes. The indexes may include OAM mode indexes, transmitter circle group indexes, and/or spatial diversity scheme indexes, among other examples.

As indicated above, FIG. 8 is provided as an example. Other examples may differ from what is described with respect to FIG. 8.

Figure 9:
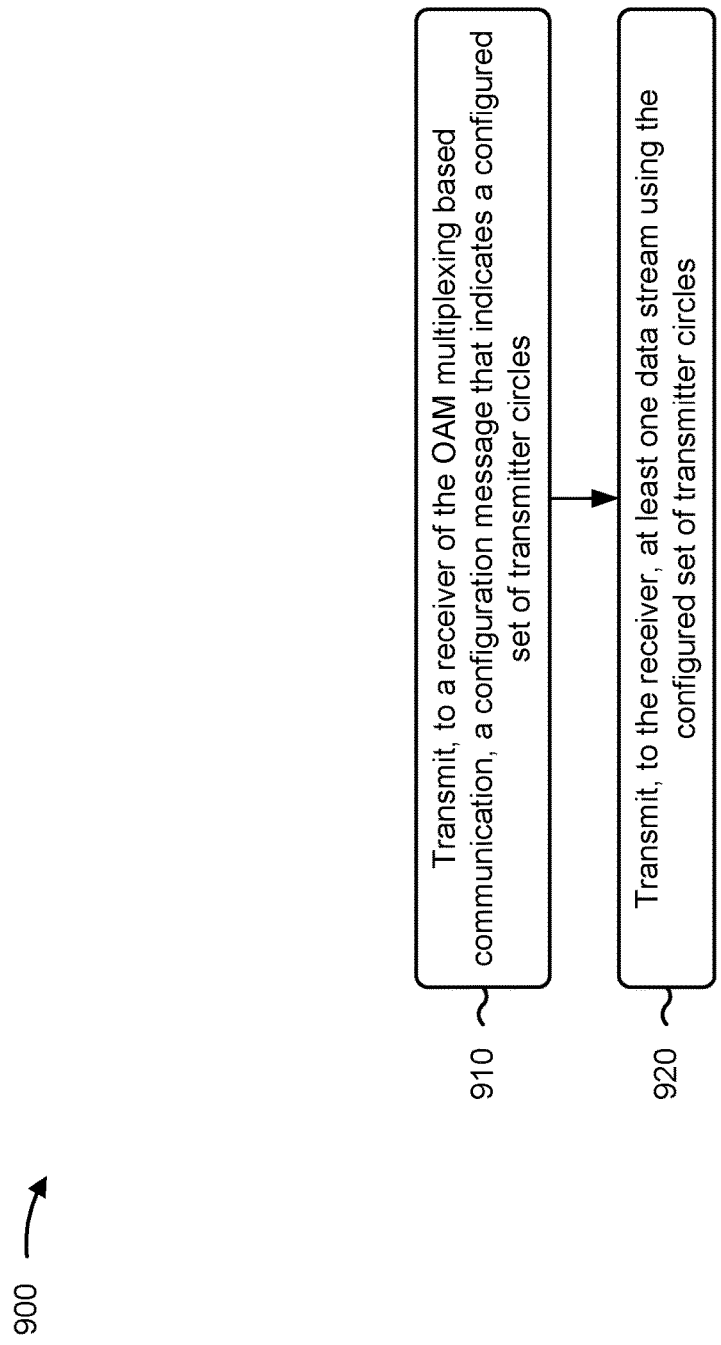
FIGS. 9 and 10 are diagrams illustrating example processes associated with spatial diversity in co-axial multi-circle OAM multiplexing based communication, in accordance with various aspects of the present disclosure.

FIG. 9 is a diagram illustrating an example process 900 performed, for example, by a transmitter, in accordance with various aspects of the present disclosure. Example process 900 is an example where the transmitter (e.g., transmitter 605) performs operations associated with spatial diversity in co-axial multi-circle OAM multiplexing based communication.

As shown in FIG. 9, in some aspects, process 900 may include transmitting, to a receiver of the OAM multiplexing based communication, a configuration message that indicates a configured set of transmitter circles (block 910). For example, the transmitter (e.g., using transmission component 1204, depicted in FIG. 12) may transmit, to a receiver of the OAM multiplexing based communication, a configuration message that indicates a configured set of transmitter circles, as described above.

As further shown in FIG. 9, in some aspects, process 900 may include transmitting, to the receiver, at least one data stream using the configured set of transmitter circles (block 920). For example, the transmitter (e.g., using transmission component 1104, depicted in FIG. 11) may transmit, to the receiver, at least one data stream using the configured set of transmitter circles, as described above.

Process 900 may include additional aspects, such as any single aspect or any combination of aspects described below and/or in connection with one or more other processes described elsewhere herein.

In a first aspect, process 900 includes transmitting, to the receiver, a status message that indicates a number of transmitter circles available.

In a second aspect, alone or in combination with the first aspect, process 900 includes transmitting, to the receiver, a status message that indicates a number of transmitter circles available for each OAM mode of a plurality of OAM modes.

In a third aspect, alone or in combination with one or more of the first and second aspects, process 900 includes transmitting, to the receiver, a status message that indicates a maximum number of modes that can used by an indicated transmitter circle.

In a fourth aspect, alone or in combination with one or more of the first through third aspects, process 900 includes receiving, from the receiver, a report message that indicates a suggested set of transmitter circles to be used.

In a fifth aspect, alone or in combination with the fourth aspect, process 900 includes transmitting, to the receiver, a plurality of reference signals corresponding to a plurality of transmitter circles, wherein at least one reference signal of the plurality of reference signals corresponds to an OAM mode of a corresponding transmitter circle, and wherein the suggested set of transmitter circles is based at least in part on a plurality of measured channel statuses corresponding to the plurality of reference signals.

In a sixth aspect, alone or in combination with one or more of the fourth or fifth aspects, the report message indicates at least one of a set of transmitter circle indexes corresponding to the set of transmitter circles, a channel state information indicator associated with the set of transmitter circles, or a parameter associated with a spatial diversity scheme.

In a seventh aspect, alone or in combination with one or more of the first through sixth aspects, transmitting the at least one data stream comprises transmitting a first signal using a first OAM mode of a first subset of transmitter circles, wherein the first signal is associated with a first data stream, and transmitting a second signal using a second OAM mode of a second subset of transmitter circles, wherein the second signal is associated with a second data stream.

In an eighth aspect, alone or in combination with the seventh aspect, the first subset of transmitter circles and the second subset of transmitter circles are full overlapping, partial overlapping or non-overlapping.

In a ninth aspect, alone or in combination with one or more of the first through eighth aspects, transmitting the at least one data stream comprises transmitting the at least one data stream using a spatial diversity scheme.

In a tenth aspect, alone or in combination with the ninth aspect, the spatial diversity scheme comprises at least one of space-time block coding, or space-frequency block coding.

In an eleventh aspect, alone or in combination with one or more of the first through tenth aspects, the configuration message indicates, for the at least one data stream and at least one corresponding OAM mode, at least one of an index of a transmitter circle of the configured set of transmitter circles, or a parameter of a spatial diversity scheme.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
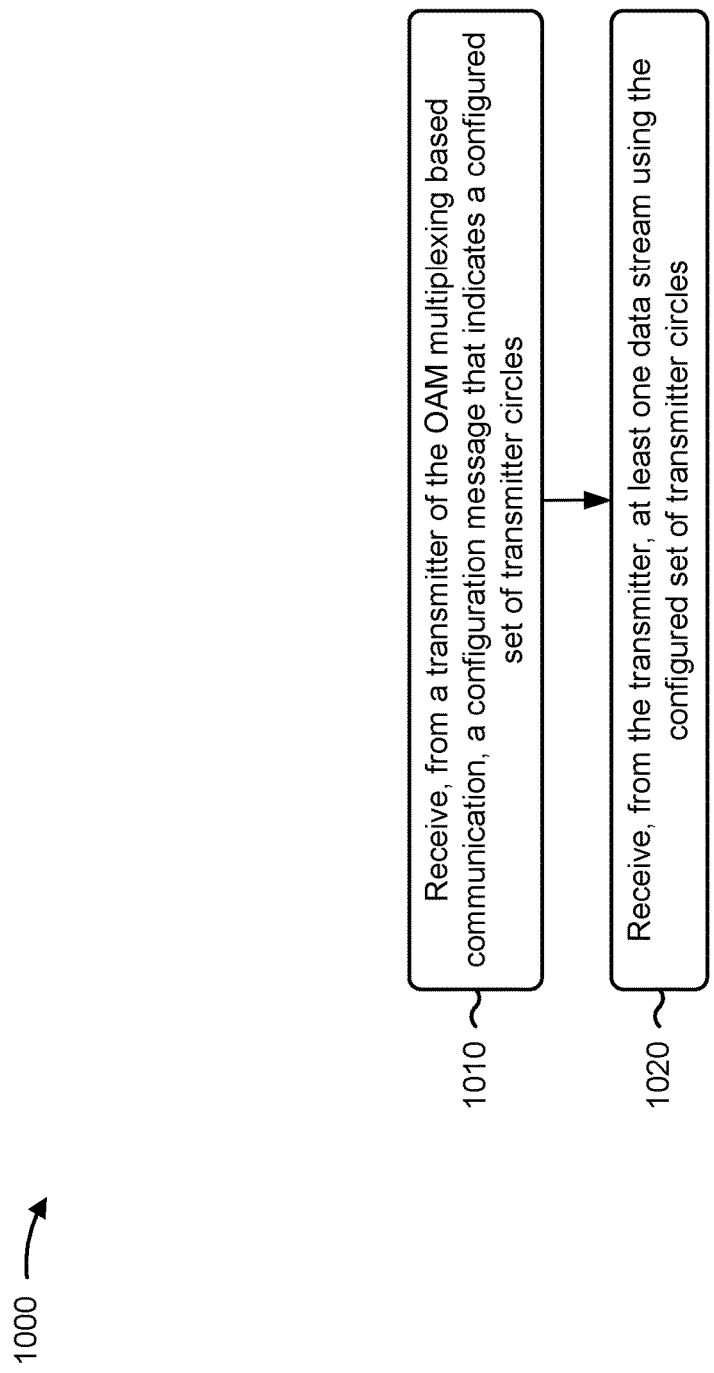

FIG. 10 is a diagram illustrating an example process 1000 performed, for example, by a receiver, in accordance with various aspects of the present disclosure. Example process 1000 is an example where the receiver (e.g., receiver 610) performs operations associated with spatial diversity in co-axial multi-circle OAM multiplexing based communication.

As shown in FIG. 10, in some aspects, process 1000 may include receiving, from a transmitter of the OAM multiplexing based communication, a configuration message that indicates a configured set of transmitter circles (block 1010). For example, the receiver (e.g., using reception component 1202, depicted in FIG. 12) may receive, from a transmitter of the OAM multiplexing based communication, a configuration message that indicates a configured set of transmitter circles, as described above.

As further shown in FIG. 10, in some aspects, process 1000 may include receiving, from the transmitter, at least one data stream using the configured set of transmitter circles (block 1020). For example, the receiver (e.g., using reception component 1202, depicted in FIG. 12) may receive, from the transmitter, at least one data stream using the configured set of transmitter circles, as described above.

Process 1000 may include additional aspects, such as any single aspect or any combination of aspects described below and/or in connection with one or more other processes described elsewhere herein.

In a first aspect, process 1000 includes receiving, from the transmitter, a status message that indicates a number of transmitter circles available.

In a second aspect, alone or in combination with the first aspect, process 1000 includes receiving, from the transmitter, a status message that indicates a number of transmitter circles available for each OAM mode of a plurality of OAM modes.

In a third aspect, alone or in combination with one or more of the first and second aspects, process 1000 includes receiving, from the transmitter, a status message that indicates a maximum number of modes that can used by an indicated transmitter circle.

In a fourth aspect, alone or in combination with one or more of the first through third aspects, process 1000 includes transmitting, to the transmitter, a report message that indicates a suggested set of transmitter circles to be used.

In a fifth aspect, alone or in combination with the fourth aspect, process 1000 includes receiving, from the transmitter, a plurality of reference signals corresponding to a plurality of transmitter circles, wherein at least one reference signal of the plurality of reference signals corresponds to an OAM mode of a corresponding transmitter circle, and wherein the suggested set of transmitter circles is based at least in part on a plurality of measured channel statuses corresponding to the plurality of reference signals.

In a sixth aspect, alone or in combination with one or more of the fourth or fifth aspects, the report message indicates at least one of a set of transmitter circle indexes corresponding to the set of transmitter circles, a channel state information indicator associated with the set of transmitter circles, or a parameter associated with a spatial diversity scheme.

In a seventh aspect, alone or in combination with one or more of the first through sixth aspects, receiving the at least one data stream comprises receiving a first signal using a first OAM mode of a first subset of transmitter circles, wherein the first signal is associated with a first data stream, and receiving a second signal using a second OAM mode of a second subset of transmitter circles, wherein the second signal is associated with a second data stream.

In an eighth aspect, alone or in combination with the seventh aspect, the first subset of transmitter circles and the second subset of transmitter circles are full overlapping, partial overlapping or non-overlapping.

In a ninth aspect, alone or in combination with one or more of the first through eighth aspects, receiving the at least one data stream comprises receiving the at least one data stream based at least in part on a spatial diversity scheme.

In a tenth aspect, alone or in combination with the ninth aspect, the spatial diversity scheme comprises at least one of space-time block coding, or space-frequency block coding.

In an eleventh aspect, alone or in combination with one or more of the first through tenth aspects, the configuration message indicates, for the at least one data stream and at least one corresponding OAM mode, at least one of an index of a transmitter circle of the configured set of transmitter circles, or a parameter of a spatial diversity scheme.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
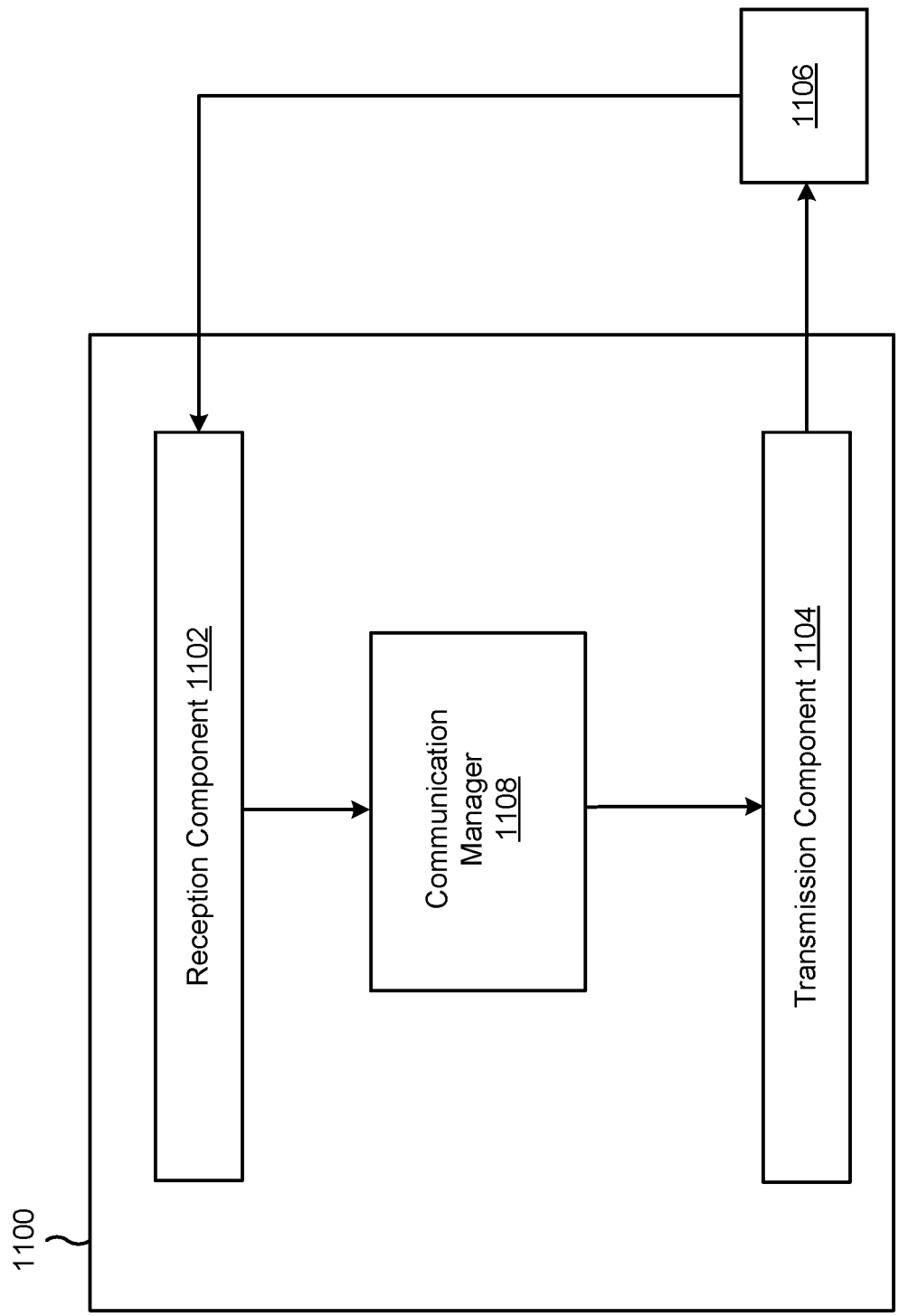
FIGS. 11 and 12 are block diagrams of example apparatuses for wireless communication, in accordance with various aspects of the present disclosure.

FIG. 11 is a block diagram of an example apparatus 1100 for wireless communication. The apparatus 1100 may be a transmitter, include a transmitter, or a transmitter may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the transmitter described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the transmitter described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the transmitter described above in connection with FIG. 2. In some aspects, the transmission component 1104 may be co-located with the reception component 1102 in a transceiver.

In some aspects, for example, the communication manager 1108 may be configured to process signals, make decisions, manage scheduling, and/or determine transmitter circles to be used, among other examples. In some aspects, the communication manager 1108 may include a controller/processor, a memory, or a combination thereof, of the transmitter described above in connection with FIG. 2. In some aspects, the communication manager 1108 may include the reception component 1102 and/or the transmission component 1104.

The transmission component 1104 may transmit, to a receiver of the OAM multiplexing based communication, a configuration message that indicates a configured set of transmitter circles. The transmission component 1104 may transmit, to the receiver, at least one data stream using the configured set of transmitter circles. The transmission component 1104 may transmit, to the receiver, a status message that indicates a number of transmitter circles available. The transmission component 1104 may transmit, to the receiver, a status message that indicates a number of transmitter circles available for each OAM mode of a plurality of OAM modes. The transmission component 1104 may transmit, to the receiver, a status message that indicates a maximum number of modes that can used by an indicated transmitter circle.

The reception component 1102 may receive, from the receiver, a report message that indicates a suggested set of transmitter circles to be used. The transmission component 1104 may transmit, to the receiver, a plurality of reference signals corresponding to a plurality of transmitter circles, wherein at least one reference signal of the plurality of reference signals corresponds to an OAM mode of a corresponding transmitter circle wherein the suggested set of transmitter circles is based at least in part on a plurality of measured channel statuses corresponding to the plurality of reference signals.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
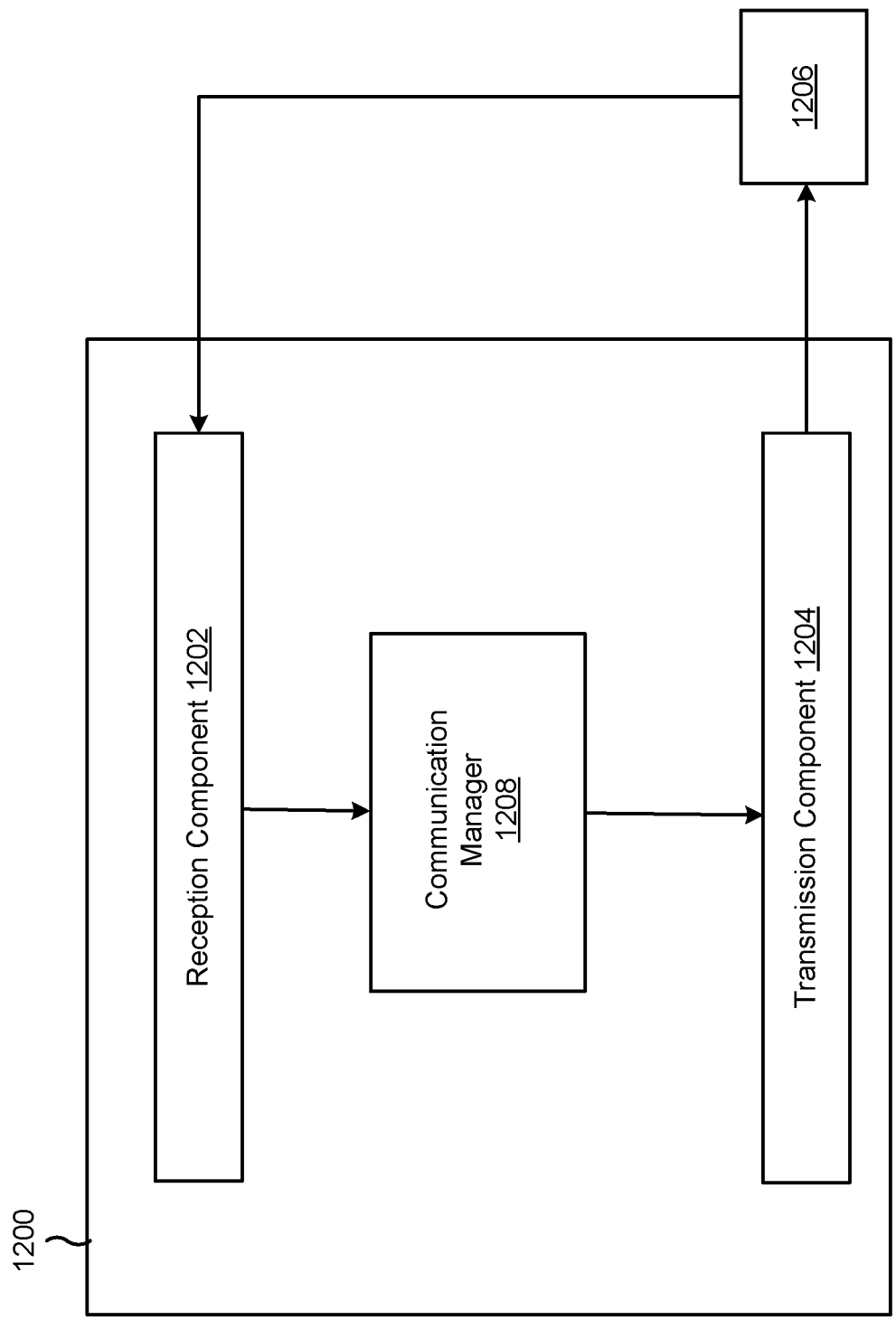

FIG. 12 is a block diagram of an example apparatus 1200 for wireless communication. The apparatus 1200 may be a receiver, include a receiver, or a receiver may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the receiver described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the receiver described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the receiver described above in connection with FIG. 2. In some aspects, the transmission component 1204 may be co-located with the reception component 1202 in a transceiver.

In some aspects, for example, the communication manager 1208 may be configured to process signals, make decisions, manage scheduling, measure reference signals, determine CSI and/or CQI, and/or determine suggested transmitter circles to be used, among other examples. In some aspects, the communication manager 1208 may include a controller/processor, a memory, or a combination thereof, of the transmitter described above in connection with FIG. 2. In some aspects, the communication manager 1208 may include the reception component 1202 and/or the transmission component 1204.

The reception component 1202 may receive, from a transmitter of the OAM multiplexing based communication, a configuration message that indicates a configured set of transmitter circles. The reception component 1202 may receive, from the transmitter, at least one data stream using the configured set of transmitter circles. The reception component 1202 may receive, from the transmitter, a status message that indicates a number of transmitter circles available. The reception component 1202 may receive, from the transmitter, a status message that indicates a number of transmitter circles available for each OAM mode of a plurality of OAM modes.

The reception component 1202 may receive, from the transmitter, a status message that indicates a maximum number of modes that can used by an indicated transmitter circle. The transmission component 1204 may transmit, to the transmitter, a report message that indicates a suggested set of transmitter circles to be used. The reception component 1202 may receive, from the transmitter, a plurality of reference signals corresponding to a plurality of transmitter circles, wherein at least one reference signal of the plurality of reference signals corresponds to an OAM mode of a corresponding transmitter circle wherein the suggested set of transmitter circles is based at least in part on a plurality of measured channel statuses corresponding to the plurality of reference signals.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of aspects of the present disclosure:

Aspect 1: A method of wireless communication performed by a transmitter of orbital angular momentum (OAM) multiplexing based communication, comprising: transmitting, to a receiver of the OAM multiplexing based communication, a configuration message that indicates a configured set of transmitter circles; and transmitting, to the receiver, at least one data stream using the configured set of transmitter circles.

Aspect 2: The method of aspect 1, further comprising transmitting, to the receiver, a status message that indicates a number of transmitter circles available.

Aspect 3: The method of either of aspects 1 or 2, further comprising transmitting, to the receiver, a status message that indicates a number of transmitter circles available for each OAM mode of a plurality of OAM modes.

Aspect 4: The method of any of aspects 1-3, further comprising transmitting, to the receiver, a status message that indicates a maximum number of modes that can used by an indicated transmitter circle.

Aspect 5: The method of any of aspects 1-4, further comprising receiving, from the receiver, a report message that indicates a suggested set of transmitter circles to be used.

Aspect 6: The method of aspect 5, further comprising transmitting, to the receiver, a plurality of reference signals corresponding to a plurality of transmitter circles, wherein at least one reference signal of the plurality of reference signals corresponds to an OAM mode of a corresponding transmitter circle, and wherein the suggested set of transmitter circles is based at least in part on a plurality of measured channel statuses corresponding to the plurality of reference signals.

Aspect 7: The method of either of aspects 5 or 6, wherein the report message indicates at least one of: a set of transmitter circle indexes corresponding to the set of transmitter circles, a channel state information indicator associated with the set of transmitter circles, or a parameter associated with a spatial diversity scheme.

Aspect 8: The method of any of aspects 1-7, wherein transmitting the at least one data stream comprises: transmitting a first signal using a first OAM mode of a first subset of transmitter circles, wherein the first signal is associated with a first data stream; and transmitting a second signal using a second OAM mode of a second subset of transmitter circles, wherein the second signal is associated with a second data stream.

Aspect 9: The method of aspect 8, wherein the first subset of transmitter circles and the second subset of transmitter circles are full overlapping, partial overlapping or non-overlapping.

Aspect 10: The method of any of aspects 1-9, wherein transmitting the at least one data stream comprises transmitting the at least one data stream using a spatial diversity scheme.

Aspect 11: The method of aspect 10, wherein the spatial diversity scheme comprises at least one of: space-time block coding, or space-frequency block coding.

Aspect 12: The method of any of aspects 1-11, wherein the configuration message indicates, for the at least one data stream and at least one corresponding OAM mode, at least one of: an index of a transmitter circle of the configured set of transmitter circles, or a parameter of a spatial diversity scheme.

Aspect 13: A method of wireless communication performed by a receiver of orbital angular momentum (OAM) multiplexing based communication, comprising: receiving, from a transmitter of the OAM multiplexing based communication, a configuration message that indicates a configured set of transmitter circles; and receiving, from the transmitter, at least one data stream using the configured set of transmitter circles.

Aspect 14: The method of aspect 13, further comprising receiving, from the transmitter, a status message that indicates a number of transmitter circles available.

Aspect 15: The method of either of aspects 13 or 14, further comprising receiving, from the transmitter, a status message that indicates a number of transmitter circles available for each OAM mode of a plurality of OAM modes.

Aspect 16: The method of any of aspects 13-15, further comprising receiving, from the transmitter, a status message that indicates a maximum number of modes that can used by an indicated transmitter circle.

Aspect 17: The method of any of aspects 13-16, further comprising transmitting, to the transmitter, a report message that indicates a suggested set of transmitter circles to be used.

Aspect 18: The method of aspect 17, further comprising receiving, from the transmitter, a plurality of reference signals corresponding to a plurality of transmitter circles, wherein at least one reference signal of the plurality of reference signals corresponds to an OAM mode of a corresponding transmitter circle, and wherein the suggested set of transmitter circles is based at least in part on a plurality of measured channel statuses corresponding to the plurality of reference signals.

Aspect 19: The method of either of aspects 17 or 18, wherein the report message indicates at least one of: a set of transmitter circle indexes corresponding to the set of transmitter circles, a channel state information indicator associated with the set of transmitter circles, or a parameter associated with a spatial diversity scheme.

Aspect 20: The method of any of aspects 13-19, wherein receiving the at least one data stream comprises: receiving a first signal using a first OAM mode of a first subset of transmitter circles, wherein the first signal is associated with a first data stream; and receiving a second signal using a second OAM mode of a second subset of transmitter circles, wherein the second signal is associated with a second data stream.

Aspect 21: The method of aspect 20, wherein the first subset of transmitter circles and the second subset of transmitter circles are full overlapping, partial overlapping or non-overlapping.

Aspect 22: The method of any of aspects 13-21, wherein receiving the at least one data stream comprises receiving the at least one data stream based at least in part on a spatial diversity scheme.

Aspect 23: The method of aspect 22, wherein the spatial diversity scheme comprises at least one of: space-time block coding, or space-frequency block coding.

Aspect 24: The method of any of aspects 13-23, wherein the configuration message indicates, for the at least one data stream and at least one corresponding OAM mode, at least one of: an index of a transmitter circle of the configured set of transmitter circles, or a parameter of a spatial diversity scheme.

Aspect 24: An apparatus for wireless communication at a device, comprising a processor; memory coupled with the processor; and instructions stored in the memory and executable by the processor to cause the apparatus to perform the method of one or more aspects of aspects 1-12.

Aspect 25: A device for wireless communication, comprising a memory and one or more processors coupled to the memory, the memory and the one or more processors configured to perform the method of one or more aspects of aspects 1-12.

Aspect 26: An apparatus for wireless communication, comprising at least one means for performing the method of one or more aspects of aspects 1-12.

Aspect 27: A non-transitory computer-readable medium storing code for wireless communication, the code comprising instructions executable by a processor to perform the method of one or more aspects of aspects 1-12.

Aspect 28: A non-transitory computer-readable medium storing a set of instructions for wireless communication, the set of instructions comprising one or more instructions that, when executed by one or more processors of a device, cause the device to perform the method of one or more aspects of aspects 1-12.

Aspect 29: An apparatus for wireless communication at a device, comprising a processor; memory coupled with the processor; and instructions stored in the memory and executable by the processor to cause the apparatus to perform the method of one or more aspects of aspects 13-24.

Aspect 30: A device for wireless communication, comprising a memory and one or more processors coupled to the memory, the memory and the one or more processors configured to perform the method of one or more aspects of aspects 13-24.

Aspect 31: An apparatus for wireless communication, comprising at least one means for performing the method of one or more aspects of aspects 13-24.

Aspect 32: A non-transitory computer-readable medium storing code for wireless communication, the code comprising instructions executable by a processor to perform the method of one or more aspects of aspects 13-24.

Aspect 33: A non-transitory computer-readable medium storing a set of instructions for wireless communication, the set of instructions comprising one or more instructions that, when executed by one or more processors of a device, cause the device to perform the method of one or more aspects of aspects 13-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter of orbital angular momentum (OAM) multiplexing based communication, comprising:
   a memory; and
   one or more processors operatively coupled to the memory, the memory and the one or more processors configured to:
      transmit, to a receiver of the OAM multiplexing based communication, a configuration message that indicates a configured set of transmitter circles, wherein the configuration message indicates, for at least one data stream, at least one of an index of a transmitter circle of the configured set of transmitter circles, or a parameter of a spatial diversity scheme; and
      transmit, to the receiver, the at least one data stream using the configured set of transmitter circles.

2. The transmitter of claim 1, wherein the one or more processors are further configured to transmit, to the receiver, a status message that indicates a number of transmitter circles available.

3. The transmitter of claim 1, wherein the one or more processors are further configured to transmit, to the receiver, a status message that indicates a number of transmitter circles available for each OAM mode of a plurality of OAM modes.

4. The transmitter of claim 1, wherein the one or more processors are further configured to transmit, to the receiver, a status message that indicates a maximum number of modes that can used by an indicated transmitter circle.

5. The transmitter of claim 1, wherein the one or more processors are further configured to receive, from the receiver, a report message that indicates a suggested set of transmitter circles to be used.

6. The transmitter of claim 5, wherein the one or more processors are further configured to transmit, to the receiver, a plurality of reference signals corresponding to a plurality of transmitter circles, wherein at least one reference signal of the plurality of reference signals corresponds to an OAM mode of a corresponding transmitter circle, and
   wherein the suggested set of transmitter circles is based at least in part on a plurality of measured channel statuses corresponding to the plurality of reference signals.

7. The transmitter of claim 5, wherein the report message indicates at least one of:
   a set of transmitter circle indexes corresponding to the suggested set of transmitter circles,
   a channel state information indicator associated with the suggested set of transmitter circles, or
   the parameter of the spatial diversity scheme.

8. The transmitter of claim 1, wherein the one or more processors, when transmitting the at least one data stream, are configured to:
   transmit a first signal using a first OAM mode of a first subset of transmitter circles, wherein the first signal is associated with a first data stream; and
   transmit a second signal using a second OAM mode of a second subset of transmitter circles, wherein the second signal is associated with a second data stream.

9. The transmitter of claim 8, wherein the first subset of transmitter circles and the second subset of transmitter circles are full overlapping, partial overlapping or non-overlapping.

10. The transmitter of claim 1, wherein the one or more processors, when transmitting the at least one data stream, are configured to transmit the at least one data stream using the spatial diversity scheme.

11. The transmitter of claim 10, wherein the spatial diversity scheme comprises at least one of:
   space-time block coding, or
   space-frequency block coding.

12. The transmitter of claim 1, wherein the configuration message indicates, for the at least one data stream and at least one corresponding OAM mode, at least one of:
   the index of the transmitter circle of the configured set of transmitter circles, or
   the parameter of the spatial diversity scheme.

13. A receiver of orbital angular momentum (OAM) multiplexing based communication, comprising:
   a memory; and
   one or more processors operatively coupled to the memory, the memory and the one or more processors configured to:
      receive, from a transmitter of the OAM multiplexing based communication, a configuration message that indicates a configured set of transmitter circles, wherein the configuration message indicates, for at least one data stream, at least one of an index of a transmitter circle of the configured set of transmitter circles, or a parameter of a spatial diversity scheme; and
      receive, from the transmitter, the at least one data stream using the configured set of transmitter circles.

14. The receiver of claim 13, wherein the one or more processors are further configured to receive, from the transmitter, a status message that indicates a number of transmitter circles available.

15. The receiver of claim 13, wherein the one or more processors are further configured to receive, from the transmitter, a status message that indicates a number of transmitter circles available for each OAM mode of a plurality of OAM modes.

16. The receiver of claim 13, wherein the one or more processors are further configured to receive, from the transmitter, a status message that indicates a maximum number of modes that can used by an indicated transmitter circle.

17. The receiver of claim 13, wherein the one or more processors are further configured to transmit, to the transmitter, a report message that indicates a suggested set of transmitter circles to be used.

18. The receiver of claim 17, wherein the one or more processors are further configured to receive, from the transmitter, a plurality of reference signals corresponding to a plurality of transmitter circles, wherein at least one reference signal of the plurality of reference signals corresponds to an OAM mode of a corresponding transmitter circle, and
   wherein the suggested set of transmitter circles is based at least in part on a plurality of measured channel statuses corresponding to the plurality of reference signals.

19. The receiver of claim 17, wherein the report message indicates at least one of:
   a set of transmitter circle indexes corresponding to the suggested set of transmitter circles,
   a channel state information indicator associated with the suggested set of transmitter circles, or
   the parameter of the spatial diversity scheme.

20. The receiver of claim 13, wherein the one or more processors, when receiving the at least one data stream, are configured to:
   receive a first signal using a first OAM mode of a first subset of transmitter circles, wherein the first signal is associated with a first data stream; and
   receive a second signal using a second OAM mode of a second subset of transmitter circles, wherein the second signal is associated with a second data stream.

21. The receiver of claim 20, wherein the first subset of transmitter circles and the second subset of transmitter circles are full overlapping, partial overlapping or non-overlapping.

22. The receiver of claim 13, wherein the one or more processors, when receiving the at least one data stream, are configured to receive the at least one data stream based at least in part on the spatial diversity scheme.

23. The receiver of claim 22, wherein the spatial diversity scheme comprises at least one of:
   space-time block coding, or
   space-frequency block coding.

24. The receiver of claim 13, wherein the configuration message indicates, for the at least one data stream and at least one corresponding OAM mode, at least one of:
   the index of the transmitter circle of the configured set of transmitter circles, or
   the parameter of the spatial diversity scheme.

25. A method of wireless communication performed by a transmitter of orbital angular momentum (OAM) multiplexing based communication, comprising:
   transmitting, to a receiver of the OAM multiplexing based communication, a configuration message that indicates a configured set of transmitter circles, wherein the configuration message indicates, for at least one data stream, at least one of an index of a transmitter circle of the configured set of transmitter circles, or a parameter of a spatial diversity scheme; and
   transmitting, to the receiver, the at least one data stream using the configured set of transmitter circles.

26. The method of claim 25, further comprising transmitting, to the receiver, a status message that indicates a number of transmitter circles available.

27. The method of claim 25, wherein the configuration message indicates, for the at least one data stream and at least one corresponding OAM mode, at least one of:
   the index of the transmitter circle of the configured set of transmitter circles,
   the parameter of the spatial diversity scheme.

28. A method of wireless communication performed by a receiver of orbital angular momentum (OAM) multiplexing based communication, comprising:
   receiving, from a transmitter of the OAM multiplexing based communication, a configuration message that indicates a configured set of transmitter circles, wherein the configuration message indicates, for at least one data stream, at least one of an index of a transmitter circle of the configured set of transmitter circles, or a parameter of a spatial diversity scheme; and
   receiving, from the transmitter, the at least one data stream using the configured set of transmitter circles.

29. The method of claim 28, further comprising receiving, from the transmitter, a status message that indicates a number of transmitter circles available.

30. The method of claim 28, wherein the configuration message indicates, for the at least one data stream and at least one corresponding OAM mode, at least one of:
   the index of the transmitter circle of the configured set of transmitter circles, or
   the parameter of the spatial diversity scheme.

* * * * *